United States Patent
Leeuwen et al.

(10) Patent No.: US 6,788,715 B1
(45) Date of Patent: Sep. 7, 2004

(54) STABILIZED LASER USING MULTIPHOTON ABSORPTION TO REDUCE INTENSITY FLUCTUATIONS

(75) Inventors: Robert Van Leeuwen, Princeton, NJ (US); Thomas Oh, Newton, PA (US)

(73) Assignee: Princeton Optronics, Mercerville, NJ (US)

( * ) Notice: Subject to any disclaimer, the term of this patent is extended or adjusted under 35 U.S.C. 154(b) by 0 days.

(21) Appl. No.: 10/448,767

(22) Filed: May 30, 2003

(51) Int. Cl.[7] .............................................. H01S 3/113
(52) U.S. Cl. ........................... 372/11; 372/20; 372/31; 372/19; 372/32
(58) Field of Search ............... 372/98, 11, 19, 372/94

(56) References Cited

U.S. PATENT DOCUMENTS

| | | | |
|---|---|---|---|
| 3,584,312 A | * 6/1971 | Statz | 372/33 |
| 4,288,861 A | * 9/1981 | Swainson et al. | 365/127 |
| 4,490,573 A | * 12/1984 | Gibbons | 136/255 |
| 4,494,873 A | * 1/1985 | Perlmutter et al. | 356/467 |
| 6,008,932 A | * 12/1999 | Luo et al. | 359/337 |
| 6,128,325 A | * 10/2000 | Goldstein et al. | 372/73 |
| 6,252,892 B1 | * 6/2001 | Jiang et al. | 372/11 |
| 6,483,100 B1 | * 11/2002 | Williams et al. | 250/214.1 |
| 2003/0179786 A1 | * 9/2003 | Kopf | 372/11 |

OTHER PUBLICATIONS

Spiegelberg et al., "Compact 100 mW Fiber Laser with 2kHz Linewidth" MP Photonics, Inc., Optical Society of American 2003, pp. 45–1–3.

Taccheo et al., "Intensity noise reductions in a single–frequency ytterblum–codaped erbium laser", Optical Letters, Nov. 1, 1996, vol. 21, No. 21, pp. 1747–1749.

* cited by examiner

*Primary Examiner*—Leon Scott, Jr.
(74) *Attorney, Agent, or Firm*—Lowenstein Sandler PC

(57) ABSTRACT

An IAU laser is stabilized to reduce intensity fluctuations. The laser comprises an IAU gain medium disposed in an optical resonance cavity and a multiphoton absorbing medium disposed in the cavity to reduce intensity fluctuations. A pump source to excite the gain medium is coupled to the cavity. In operation, the multiphoton absorbing material absorbs primarily at high intensity levels, effectively increasing the loss at high intensities. In an advantageous embodiment, the active medium comprises erbium-doped glass and the multiphoton absorber comprises a body of semiconductor exhibiting two-photon absorption at the emission wavelength.

15 Claims, 1 Drawing Sheet

STABILIZED LASER USING MULTIPHOTON ABSORPTION TO REDUCE INTENSITY FLUCTUATIONS

FIELD OF THE INVENTION

This invention relates to the amplitude stabilization of continuous-wave (CW) lasers and, in particular, to the stabilization of intrinsically amplitude-unstable (IAU) lasers to reduce laser intensity fluctuations.

BACKGROUND OF THE INVENTION

Lasers with low relative intensity noise (low RIN) are important in many applications, such as optical communications, testing and measurement. Amplitude variations in these systems will degrade performance, leading to, for example, to an increase in bit error rate and loss of measurement resolution. In optical communication systems, for example, data is sent as a modulation of an optical carrier signal from a laser source. The quality of the data transmission is contingent upon the quality of the carrier signal, and any amplitude fluctuation in the laser directly degrades the integrity of the data signal. It is important in an optical system that any laser used as a signal source be substantially free of excessive intensity fluctuations.

Unfortunately, certain laser systems that may otherwise possess desirable characteristics cannot be used for low RIN applications because the lasers are intrinsically amplitude unstable (IAU). An IAU laser is one in which the natural lifetime of the upper lasing state (excited state) is substantially longer than the photon lifetime in the cavity. IAU lasers are subject to spiking, intensity fluctuations, and relaxation oscillations, making them unsuitable for applications where low RIN is required.

Therefore there is a need for stabilization of IAU lasers to permit their use in low RIN applications.

SUMMARY OF THE INVENTION

In accordance with the invention, the IAU laser is stabilized in amplitude by providing a multiphoton absorbing medium disposed in the cavity to reduce intensity fluctuations. A pump source to excite the gain medium is coupled to the cavity. In operation, the multiphoton absorbing material absorbs primarily at high intensity levels, selectively increasing the loss at high intensities without correspondingly increasing the loss at low intensities. In an advantageous embodiment, the active medium comprises erbium-doped glass and the multiphoton absorber comprises a body of semiconductor exhibiting two-photon absorption at the laser emission wavelength.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
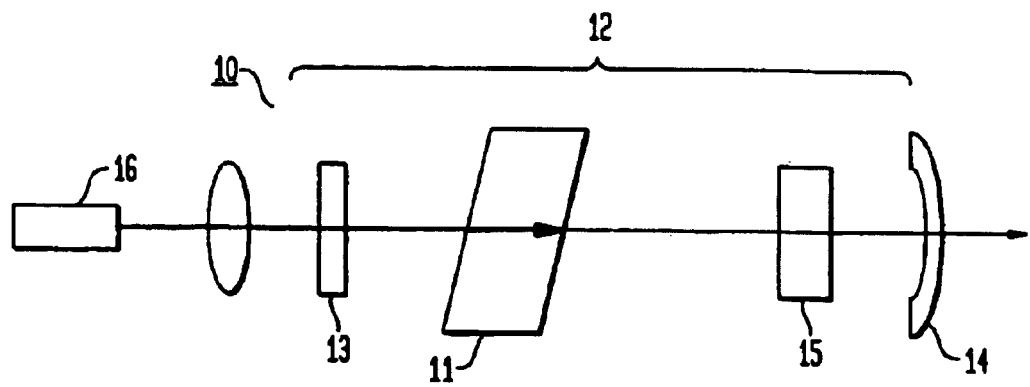
FIG. 1 is a schematic diagram of a stabilized IAU laser in accordance with the invention.

Referring to the drawings, FIG. 1 is a schematic diagram of a IAU laser 10 in accordance with the invention. The laser 10 comprises a gain medium 11 disposed within an optical resonance cavity 12 formed, for example, by reflectors 13 (input) and 14 (output). Disposed within the cavity 12 in the path of the light is a multiphoton absorber 15 at the wavelength of laser emission.

A pump source 16 is coupled to the cavity to excite the gain medium 11 to emission. The pump energy is typically light of shorter wavelength than the emission, and conveniently the input reflector 13 is a wavelength-selective reflector that transmits the pump light while highly reflecting the emission light. The output reflector 14 can be partially reflective to the emission light to permit an output of coherent laser light.

In advantageous embodiments, the IAU gain medium 11 comprises a solid state gain medium such as rare earth doped glass. For example, the medium 11 is advantageously erbium-ytterbium doped phosphate glass for lasing in the 1500 nanometer window. Ruby (chromuim doped aluminum oxide) provides an alternative solid state gain medium. The multiphoton absorber is conveniently a two-photon absorber. It can comprise an electronic bandgap material such as an elemental semiconductor (e.g. silicon) or a compound semiconductor (e.g. gallium arsenide, cadmuim telluride or zinc oxide).

In operation, light from the pump source excites the gain medium to spontaneous emission and amplification. The emitted light is partially confined within the resonance cavity and passes through the multiphoton absorber 15 and the gain medium 11 many times before a portion escapes as coherent light through partially reflective output mirror 14.

Figure 2:
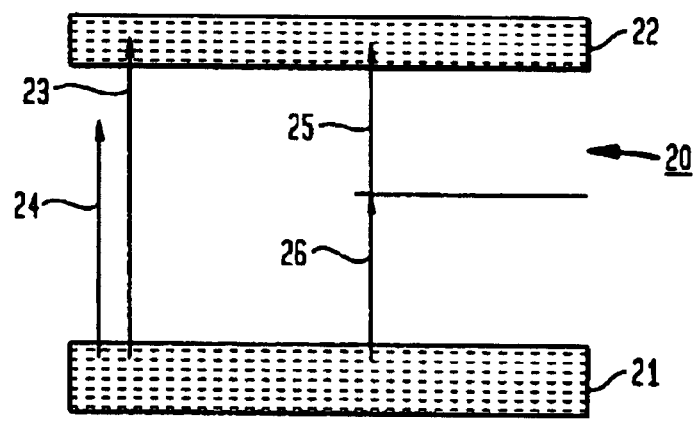
FIG. 2 is a schematic energy band diagram of a typical semiconductor useful as a multiphoton absorber.

The intracavity multiphoton absorber 15 reduces intensity fluctuations within the cavity 12 and hence fluctuations in the output intensity. The effect of absorber 15 can be understood by consideration of FIG. 2 which schematically illustrates the well-known energy band characteristic of crystalline semiconductors. In essence, there is a "forbidden" energy gap 20 between a valence band 21 and a conduction band 22 in which electrons cannot reside. The energy difference E between these bands is the gap energy. Light 23 having a photon energy $hf_1$, greater than the gap energy E can excite electrons from the valence band to the conduction band, so that such light can be absorbed in the semiconductor. Light 24 having photon energy $hf_2$ less than E will not normally excite an electron transition. Such light at low intensities will pass through the semiconductor substantially unattenuated. However, if the combined energy of two photons is greater than or equal to E, i.e, $2hf_2 \geq E$, then at sufficient intensity some electrons will simultaneously absorb two (or more) photons 25, 26 and be excited from the valence band to the conduction band. Thus for a beam of light passing through the semiconductor, the absorption loss is low at lower intensities and becomes higher in the event of high intensities.

The additional loss introduced by the semiconductor in the cavity 12 is given by $dI/dz = BI^2$, where B is the two-photon absorption coefficient, I is the laser intensity, and z is the distance in the absorber along the optical axis. The path length in the absorber can be chosen so that the loss is very low (less than 0.01% and preferably on the order of 0.001%). Hence, there is no substantial reduction of power. However, because the loss is nonlinear, the relative loss increases with higher intensity. The change is extremely small, but because the cavity is very sensitive to small losses at the relaxation oscillation frequency, the losses effectively counteract the intensity fluctuations of the laser.

If the photon energy of the laser light is less than the bandgap of the semiconductor material, there will be no significant linear absorption. For instance, both silicon and gallium arsenide have bandgaps larger than the energy of a photon with a wavelength of 1.5 micrometers, the lasing wavelength for the ErYb doped glass. This low linear absorption is particularly important in low gain media like ErYb doped glass, where small losses will result in significant reductions in power.

Figure 3:
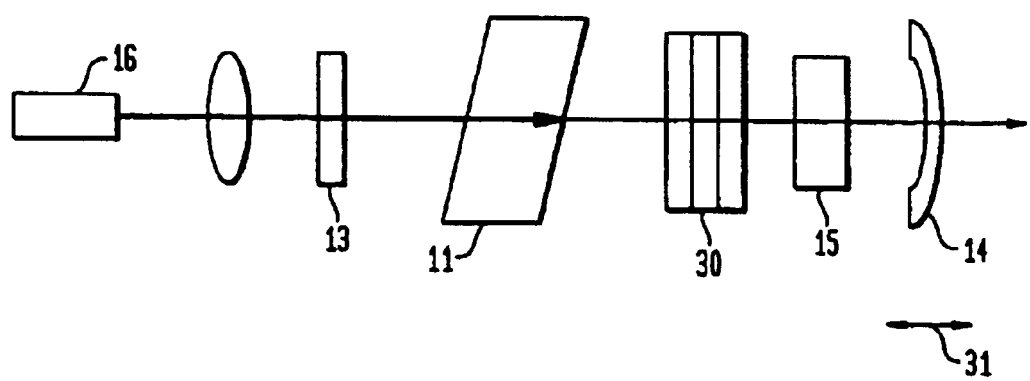
FIG. 3 shows an advantageous embodiment wherein the rare earth laser uses a Yb and Er doped gain medium and incorporates tuning etalons to form a low noise, widely tunable laser.

FIG. 3 is a schematic of an advantageous stabilized tunable IAU laser that includes extra tuning elements 30 and 31. One tuning element 30 is a tunable Fabry-Perot etalon that selects a single longitudinal mode or wavelength in the laser cavity. The selection of the desired wavelength mode is achieved by adjusting the spacing between the two etalon mirrors. The other tuning element 31 is a z-position adjuster for changing the position of the output mirror of the laser cavity. The movement of this mirror changes the length of the laser cavity thus varying the wavelength of the selected laser mode. An alternative arrangement is to put the z-position adjuster on the high reflector mirror 13. A stabilized tunable laser as shown in FIG. 3 is particularly useful as a source for optical communication links in Dense Wavelength Division Multiplexing (DWDM) systems.

The invention may now be more clearly understood by consideration of the following specific examples:

EXAMPLE 1

One specific example is a stabilized MEMS tunable laser. This laser uses a 975 nm wavelength edge emitting pump laser that is focused using a dual orthogonal cylindrical lens to form a collimated round beam in the gain medium. The gain medium is a block of glass doped with Yb and Er rare earth ions and provides gain over a band of wavelengths between 1528 nm and 1564 nm. One face of the glass is arranged to form the input mirror and is coated with multilayer dielectric coating that transmits 975 nm pump wavelength and fully reflects the band of wavelengths 1528–1564 nm. This face forms the left mirror of the laser cavity. A silicon MEMS etalon is inserted in the cavity and is designed to form a tunable Fabry-Perot etalon that tunes the laser to one wavelength mode in the 1528–1564 nm band nearest the desired wavelength. Silicon is a multi-photon absorber and so this also acts to stabilize the laser. A reflector is placed after the MEMS tunable etalon to form the right output mirror. This mirror is mounted on a piezoelectric device that moves the mirror axially in the laser cavity to tune the selected wavelength to the desired wavelength. This mirror is partially reflecting and the transmitted portion of the laser beam forms the output.

EXAMPLE 2

A second example uses the same pump laser and lens arrangement to form the collimated pump beam. This beam is directed into the first glass element that comprises the first gain medium being a block of glass doped with Yb and Er rare earth ions and providing gain over a band of wavelengths between 1528 nm and 1564 nm. The first face of the glass is arranged to form the input mirror and is coated with multilayer dielectric coating that transmits 975 nm pump wavelength and fully reflects the band of wavelengths 1528–1564 nm. This face forms the left mirror of the laser cavity. The second face of the glass is formed at the Brewster angle which transmits one polarization of laser light without reflection. The second element is a second glass element of the same doped material to form a second gain element. The first face is also formed at the same Brewster angle. The second face of the second element is formed approximately perpendicular to the laser cavity axis and is made partially reflecting. This forms the first mirror of a Fabry-Perot tuning etalon. The third element in the laser cavity is GaAs to act as the multi-photon absorber to stabilize the laser. The first surface is made partially reflecting and forms the second mirror of the Fabry-Perot tuning etalon. This mirror has the same reflectivity as the Fabry-Perot etalon first mirror and is arranged to be accurately parallel to it. The other surface of the GaAs is a partial reflecting mirror and forms the second, right mirror of the laser cavity. The GaAs element and one of the glass elements are mounted on Piezoelectric elements to move them axially. Adjusting the gap between the etalon mirrors selects the appropriate wavelength mode and moving the input mirror in relation to the laser output mirror fine tunes the wavelength to the desired value. These example arrangements thus form a stabilized tunable laser in the 1528 nm to 1564 nm wavelength band.

It is to be understood that the above-described embodiments are illustrative of only a few of the many possible specific embodiments which can represent applications of the principles of the invention. While the invention has been described primarily in relation to ytterbium/erbium lasers, it is equally applicable to other IAU lasers such as those using erbium, ytterbium, neodymium and praseodymium or other non rare earth elements as defined above for an IAU laser. Also while the inventive lasers have been illustrated using coupled cavity resonators, they can alternatively use ring cavity resonators. Thus numerous and various other arrangements can be made by those skilled in the art without departing from the spirit and scope of the invention.

What is claimed is:

1. A tunable continuous wave laser comprising:
   an optical resonance cavity comprising a pair of reflectors;
   an optical again medium disposed in the cavity, the laser being an intrinsically amplitude unstable laser in that the gain medium has a natural lifetime of an upper lasing state which is substantially longer than a photon lifetime in the cavity;
   a pump source coupled to the cavity to excite the gain medium to laser emission;
   a tuning element connected to one of the reflectors for tuning a wavelenght of laser emission by changing the position of one of the reflectors relative to the other reflector thereby changing the length of the optical cavity; and
   a multi-photon absorber disposed in the optical path within the cavity to absorb light by multiphoton absorption at the wavelength of laser emission thereby reducing spiking, intensity fluctuations and relaxation oscillations of the laser and providing a continuous wave laser output.

2. The laser of claim 1 wherein the multi-photon absorber comprises an electronic band gap material.

3. The laser of claim 1 wherein the multi-photon absorber comprises a two photon absorber at the gain medium wavelength.

4. The laser of claim 2 wherein the band gap of material is greater than the energy of a photon of the wavelength of laser emission.

5. The laser of claim 1 wherein the gain medium comprises a solid state gain medium.

6. The laser of claim 1 wherein the gain medium comprises a doped glass gain medium.

7. The laser of claim 1 wherein the gain medium comprises a rare earth doped glass.

8. The laser of claim 1 wherein the gain medium comprises erbium doped glass.

9. The laser of claim 1 wherein the multi-photon absorber comprises silicon.

10. The laser of claim 1 wherein the multi-photon absorber comprises gallium arsenide.

11. The laser of claim 1 wherein the gain medium comprises erbium doped glass and the multi-photon absorber comprises silicon or gallium arsenide.

12. The laser of claim 1 comprising a tunable etalon disposed in the optical resonance cavity, the tunable etalon comprises two etalon mirrors, wherein the laser wavelength mode is selected by adjusting the spacing between the two etalon mirrors.

13. The laser of claim 1 wherein the gain medium comprises erbium-ytterbium doped phosphate glass.

14. The laser of claim 1 wherein the gain medium comprises erbium, ytterbium, neodymium or praseodymium.

15. The laser of claim 1 wherein the multi-photon absorber comprises cadmium telluride or zinc oxide.

* * * * *